US009078255B2

(12) United States Patent
Pang et al.

(10) Patent No.: US 9,078,255 B2
(45) Date of Patent: Jul. 7, 2015

(54) METHOD AND APPARATUS FOR ALLOCATING ALMOST BLANK SUBFRAMES

(75) Inventors: Jiyong Pang, Shanghai (CN); Qi Jiang, Shanghai (CN); Teck Hu, Melbourne, FL (US); Dongyao Wang, Shanghai (CN); Jun Wang, Shanghai (CN); Gang Shen, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 490 days.

(21) Appl. No.: 13/479,439

(22) Filed: May 24, 2012

(65) Prior Publication Data

US 2013/0044704 A1 Feb. 21, 2013

Related U.S. Application Data

(60) Provisional application No. 61/524,292, filed on Aug. 16, 2011.

(51) Int. Cl.
*H04W 72/04* (2009.01)
*H04W 72/08* (2009.01)
*H04W 92/20* (2009.01)

(52) U.S. Cl.
CPC ...... *H04W 72/0426* (2013.01); *H04W 72/0446* (2013.01); *H04W 72/082* (2013.01); *H04W 92/20* (2013.01)

(58) Field of Classification Search
None
See application file for complete search history.

(56) References Cited

U.S. PATENT DOCUMENTS

| 2009/0257390 A1 | 10/2009 | Ji et al. | 370/329 |
| 2012/0149362 A1* | 6/2012 | Tooher et al. | 455/423 |
| 2012/0207025 A1* | 8/2012 | Barbieri et al. | 370/236 |

FOREIGN PATENT DOCUMENTS

| JP | 2003111133 A | 4/2003 |
| WO | WO 2009 112559 | 8/2012 |

OTHER PUBLICATIONS

Title "*Further Discussion on ABS Status Resource Report for eICIC*" 3GPP TSG-RAN WG3 #73 R3-112162 Athens, Greece, Aug. 22-26, 2011 Agenda item: 10.7; Source: Alcatel-Lucent Shanghai Bell, Alcatel-Lucent.
International Search Report PCT/US2012/049897 dated Oct. 25, 2012.
Written Opinion dated Oct. 25, 2012.
Nokia Siemens Networks: "On TDM eICIC Coordination for Macro+Pico Cases", 3GPP Draft; R3-102817 PICOMACRO_TDMEICICOORD, 3rd_Generation Partnership Project (3GPP), Mobile Competence Centre; 650, Route Des Lucioles; F-06921 Sophia-Antipolis Cedex; France, vol. RAN WG3, No. Xi'an; 20101011, Oct. 2, 2010, XP050453624, [retrieved on Oct. 2, 2010] the whole document.

(Continued)

*Primary Examiner* — Alex Skripnikov
(74) *Attorney, Agent, or Firm* — Davidson Sheehan LLP

(57) ABSTRACT

The present application describes embodiments of methods and apparatuses for controlling communications within a first cell that is overlapped by a second cell. One embodiment of the method includes receiving a signal at the second cell indicating a number of devices selected to communicate with the first cell and identifying a set of subframes during which communications are permitted to take place within the first cell based on the number of devices selected to communicate with the first cell. This embodiment of the method also includes delivering an indication of the set of subframes to the first cell.

34 Claims, 3 Drawing Sheets

(56) References Cited

OTHER PUBLICATIONS

Qualcomm Incorporated: "Way forward for eICIC on reporting the number of active UEs requiring protection", 3GPP Draft; R3-110733, 3rd Generation Partnership Project (3GPP), Mobile Competence Centre ; 650, Route Des Lucioles ; F-06921 Sophia-Antipolis Cedex; France, vol. RAN WG3, no. Taipei, Taiwan; 20110221, Feb. 15, 2011, XP050497650, [retrieved on Feb. 15, 2011] the whole document.

Alcatel-Lucent Shanghai Bell et al: "Almost Blank Subframe Request from Pico to Macro eNB", 3GPP Draft; R3-103336, 3rd Generation Partnership Project (3GPP), Mobile Competence Centre; 650, Route Des Lucioles; F-06921 Sophia-Antipolis Cedex; France vol. RAN WG3, no. Jacksonville, USA; 20101115, Nov. 8, 2010, XP050466332, [retrieved on Nov. 8, 2010] the whole document.

Qualcomm Incorporated: "More on resource status report for eICIC", 3GPP Draft; R3-110163, 3rd Generation Partnership Project (3GPP), Mobile Competence Centre; 650, Route Des Lucioles; F 6921 Sophia-Antipolis Cedex; France vol. RAN WG3, no. Dublin, Ireland; 20110117, Jan. 11, 2011, XP050497160, [retrieved on Jan. 11, 2011] the whole document.

Alcatel-Lucent Shanghai Bell et al: "Further Discussion on ABS Status Resource Report for eICIC", 3GPP Draft; R3-112162, 3rd Generation Partnership Project (3GPP), Mobile Competence Centre ; 650, Route Des Lucioles; F06921 Sophia-Antipolis Cedex; France, vol. RAN WG3, no. Athens, Greece 20110822, Sep. 9, 2011, XP050541786, [retrieved on Sep. 9, 2011] the whole document.

* cited by examiner

METHOD AND APPARATUS FOR ALLOCATING ALMOST BLANK SUBFRAMES

CROSS REFERENCE TO RELATED APPLICATIONS

This application claims priority to U.S. Provisional Patent Application 61/524,292, filed on Aug. 16, 2011.

BACKGROUND

This application relates generally to communication systems, and, more particularly, to wireless communication systems.

Wireless communication systems include a network of devices for providing wireless connectivity to wireless-enabled devices including mobile units, smart phones, tablet devices, laptops, desktops, and other types of user equipment. Network architectures generally fall into two broad categories: hierarchical and distributed. Hierarchical network architectures used centralized entities to handle mobility management and radio resource control. For example, in conventional hierarchical communications, a server transmits voice and/or data signaling destined for a target access terminal to a central element such as such as a Radio Network Controller (RNC). The RNC may then transmit paging messages to the target access terminal via one or more access nodes to locate the target access terminal. The target access terminal may establish a communication link to one or more of the access nodes in response to receiving the page from the network. A radio resource management function within the RNC receives the voice and/or data signaling and coordinates the radio and time resources used by the set of access nodes to transmit the information to the target access terminal. The radio resource management function can perform fine grain control to allocate and release resources for broadcast transmission over a set of access nodes.

In contrast, a distributed network includes access points that implement distributed communication network functionality. For example, each distributed access point may combine part or all of the RNC and/or Packet Data Serving Node (PDSN) functions in a single entity that manages radio links between one or more access terminals and an outside network, such as the Internet. Distributed access points may implement proxy functionality that utilizes core network element support to equivalent IP functions. For example, IP anchoring in a UMTS base station router may be offered through a Mobile IP Home Agent (HA) and the Gateway GPRS Support Node (GGSN) anchoring functions that the base station router proxies through equivalent Mobile IP signaling. Compared to hierarchical networks, distributed architectures have the potential to reduce the cost and/or complexity of deploying the network, as well as the cost and/or complexity of adding additional access points to expand the coverage of an existing network. Distributed networks may also reduce (relative to hierarchical networks) the delays experienced by users because packet queuing delays at the RNC and PDSN of hierarchical networks may be reduced or removed.

At least in part because of the reduced cost and complexity of deploying a base station router, base station routers may be deployed in locations that are impractical for conventional base stations. For example, a base station router may be deployed in a residence or building to provide wireless connectivity to the occupants of the residents or the building. Base station routers deployed in a residence are typically referred to as home base station routers or femtocells because they are intended to provide wireless connectivity to a small area that encompasses a residence. Home base station routers may also be referred to as microcells, picocells, small cells, and the like. However, the functionality in a home base station router is typically quite similar to the functionality implemented in a conventional base station router that is intended to provide wireless connectivity to a macro-cell that may cover an area of approximately a few square kilometers. One important difference between a home base station router and a conventional base station router is that home base station routers are designed to be plug-and-play devices that can be purchased off-the-shelf and easily installed by a lay person.

As communication networks grow and evolve, they incorporate numerous types and generations of wireless communication systems that provide network connectivity according to different standards and/or protocols. Networks that implement different types of access devices that operate according to different standards and/or protocols are typically referred to as heterogeneous networks. Exemplary heterogeneous networks include systems that provide wireless connectivity to femtocells (e.g., systems that provide wireless connectivity according to the IEEE 802.11, IEEE 802.15, or Wi-Fi standards) and systems that provide wireless connectivity to macrocells (e.g., systems that operate according to the Third Generation Partnership Project standards—3GPP, 3GPP2—and/or systems operate according to the IEEE 802.16 and IEEE 802.20 standards). Multiple generations of these systems have been deployed including Second Generation (2G), Third Generation (3G), and Forth Generation (4G) standards.

The coverage provided by different service providers in a heterogeneous communication system may intersect and/or overlap. For example, a wireless access node for a wireless local area network may provide network connectivity to mobile nodes in a femtocell, microcell, or picocell associated with a coffee shop that is within the macrocell coverage area associated with a base station of a cellular communication system. For another example, cellular telephone coverage from multiple service providers may overlap and mobile nodes may therefore be able to access the wireless communication system using different generations of radio access technologies, e.g., when one service provider implements a 3G system and another service provider implements a 4G system. For yet another example, a single service provider may provide coverage using overlaying radio access technologies, e.g., when the service provider has deployed a 3G system and is in the process of incrementally upgrading to a 4G system.

Transmissions into overlaying coverage areas may interfere with each other. For example, downlink signals transmitted by a macrocell are often stronger than the downlink signals transmitted by picocells in portions of the overlaying coverage area of the picocell. User equipment being served by the picocells may therefore receive strong interfering signals from the macrocell, which can dramatically reduce the signal to noise ratio for the user equipment. Intercell interference coordination (ICIC, eICIC) can be used to reduce or mitigate this interference. For example, almost blank subframes (ABS) can be defined during one or more subframes. The macrocell bypasses transmission of downlink traffic during the almost blank subframes to reduce interference for user equipment that are currently being served by the overlaying picocells. However, the standards governing allocation of the almost blank subframes lack clarity and do not provide adequate mechanisms for supporting efficient and dynamic ABS algorithms.

SUMMARY OF EMBODIMENTS

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, embodiments of methods are provided for controlling communications within a first cell that is overlapped by a second cell. One embodiment of the method includes receiving a signal at the second cell indicating a number of devices selected to communicate with the first cell and identifying a set of subframes during which communications are permitted to take place within the first cell based on the number of devices selected to communicate with the first cell. This embodiment of the method also includes delivering an indication of the set of subframes to the first cell. Apparatuses are also provided that implement embodiments of this method.

In another embodiment, embodiments of methods are provided for controlling communication within a first cell that is overlapped by a second cell. One embodiment of the method includes delivering a signal from the first cell indicating a number of devices selected to communicate with the first cell and receiving a signal indicating a set of subframes during which communications are permitted to take place within the first cell based on the number of devices selected to communicate with the first cell. This embodiment also includes communicating with the one or more of the devices via the first cell during the set of subframes. Apparatuses are also provided that implement embodiments of this method.

In another embodiment, embodiments of methods are provided for controlling communications within a first cell that is overlapped by a second cell. One embodiment includes identifying at the first cell a number of devices selected to communicate with the first cell and communicating the number to the second cell. This embodiment also includes receiving the number at the second cell and identifying a set of subframes during which communications are permitted to take place within the first cell based on the number. This embodiment further includes delivering an indication of the set of subframes to the first cell and communicating with one or more of the devices via the first cell during the set of subframes. Apparatuses are also provided that implement embodiments of this method.

In another embodiment, embodiments of a method are provided for controlling communications within a first cell that is overlapped by a second cell. One embodiment includes identifying at the second cell a set of subframes during which communications are permitted to take place within the first cell and delivering an indication of the set of subframes to the first cell. This embodiment also includes receiving a request at the second cell to alter the set of subframes during which communications are permitted to take place within the first cell. Apparatuses are also provided that implement embodiments of this method.

In another embodiment, embodiments of a method are provided for controlling communication within a first cell that is overlapped by a second cell. One embodiment of the method includes receiving from the second cell a set of subframes during which communications are permitted to take place within the first cell and sending a request to the second cell to alter the set of subframes during which communications are permitted to take place within the first cell. Apparatuses are also provided that implement embodiments of this method.

In another embodiment, embodiments of a method are provided for controlling communications within a first cell that is overlapped by a second cell. One embodiment of the method includes identifying at the second cell a set of subframes during which communications are permitted to take place within the first cell and delivering an indication of the set of subframes to the first cell. This embodiment also includes sending a request to the second cell to alter the set of subframes during which communications are permitted to take place within the first cell. Apparatuses are also provided that implement embodiments of this method.

In another embodiment, embodiments of a method are provided for controlling communications within a first cell that is overlapped by a second cell. One embodiment of the method includes receiving a signal at the second cell indicating a number of devices selected to communicate with the first cell and identifying at the second cell a set of subframes during which communications are permitted to take place within the first cell based on the number of devices selected to communicate with the first cell. This embodiment also includes delivering an indication of the set of subframes to the first cell and receiving a request at the second cell to alter of the set of subframes during which communications are permitted to take place within the first cell. Apparatuses are also provided that implement embodiments of this method.

In another embodiment, embodiments of a method are provided for controlling communications within a first cell that is overlapped by a second cell. Embodiments of this method include delivering a signal from the first cell indicating a number of devices selected to communicate with the first cell and receiving a signal indicating a set of subframes during which communications are permitted to take place within the first cell based on the number of devices selected to communicate with the first cell. This embodiment also includes communicating with the one or more of the devices via the first cell during the set of subframes and sending a request to the second cell to alter the set of subframes during which communications are permitted to take place within the first cell. Apparatuses are also provided that implement embodiments of this method.

In another embodiment, embodiments of a method are provided for controlling communications within a first cell that is overlapped by a second cell. One embodiment of the method includes identifying at the first cell a number of devices selected to communicate with the first cell, communicating the number to the second cell and receiving the number at the second cell, and identifying a set of subframes during which communications are permitted to take place within the first cell based on the number. This embodiment also includes delivering an indication of the set of subframes to the first cell and communicating with one or more of the devices via the first cell during the set of subframes. This embodiment further includes sending a request to the second cell to alter the set of subframes during which communications are permitted to take place within the first cell. Apparatuses are also provided that implement embodiments of this method.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
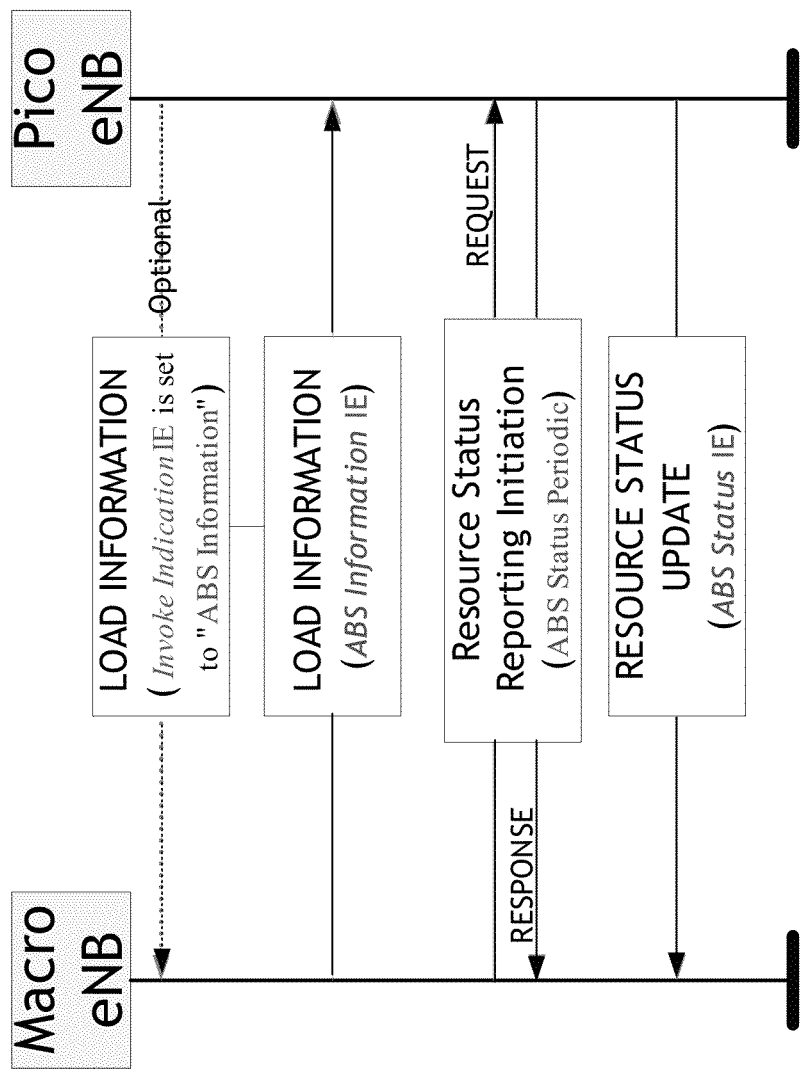
FIG. 1 conceptually illustrates a conventional message flow over an X2 interface between a macro eNB and a picocell eNB.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present application describes embodiments of techniques for facilitating communication between base stations or other access devices that provide overlaying wireless coverage. In one embodiment, the devices communicate by transmitting messages that include information elements defined according to agreed-upon standards and/or protocols. For example, the Long Term Evolution (LTE) of the standards and/or protocols defined by the Third Generation Partnership Project (3GPP) specifies an X2 interface for providing signaling between e-node Bs (eNBs). The X2 interface is used to carry signaling related to mobility management, load management, error reporting, and the like. Embodiments of the X2 interface are described in the 3GPP Technical Specification 36.423.

In LTE Release 10 eICIC, it has been agreed that the X2 interface supports messages including information elements (IEs) that indicate the status of almost blank subframes (ABS). The ABS Status IE may be used to facilitate the X2 signaling coordination to aid the eNB designating ABS to evaluate the need for modification of the ABS pattern. For example, the ABS pattern may indicate which of the 40 subframes in the 40 ms periodic subframe structure are ABS subframes. The conventional ABS Status IE includes two elements: the DL ABS status and Usable ABS Pattern Info. These two elements are reported via a RESOURCE STATUS UPDATE message. The DL ABS status includes the percentage of resource blocks of ABS allocated to protect UEs from inter-cell interference. The Usable ABS Pattern information indicates the usable ABS pattern, which is a subset of, or the same as, the corresponding ABS Pattern Info IE conveyed in the LOAD INFORMATION message. Table 1 shows an exemplary definition of the ABS Status information element.

TABLE 1

| IE/Group Name | Presence | Range | IE type and reference | Semantics description |
|---|---|---|---|---|
| DL ABS status | M | | INTEGER (0 . . . 100) | Percentage of resource blocks of ABS allocated for UEs protected by ABS from inter-cell interference. This includes resource blocks of ABS unusable due to other reasons. The denominator of the percentage calculation is indicated in the Usable ABS Information. |
| >>Usable ABS Pattern Info | M | | FDD: BIT STRING (SIZE(40)) TDD: BIT STRING (1 . . . 70) | Each position in the bitmap represents a subframe, for which value "1" indicates 'ABS that has been designated as protected from inter-cell interference' and value "0" indicates 'ABS that is not usable as protected ABS from inter-cell interference'. The pattern represented by the bitmap is a subset of, or the same as, the corresponding ABS Pattern Info IE conveyed in the LOAD INDICATION message. |

FIG. 1 conceptually illustrates a conventional message flow over an X2 interface between a macro eNB and a picocell eNB. The conventional message flow has a number of drawbacks. For example, the current definitions lack clarity. The ABS Status IE is not clearly defined and introduces ambiguities in interpretation that may eventually lead to ambiguities, inconsistencies, and/or incompatibilities between different implementations of the standard. While arguments can be made that ambiguity may be intentional to facilitate freedom of implementation, in this case it is indeed not the case and leads to a number of drawbacks. For another example, the conventional specification does not provide an adequate mechanism to support efficient and dynamic algorithms based on the information carried over X2 in the ABS status information element. Some of the particular drawbacks of the conventional specification are described below.

First, the downlink ABS status element includes an integer that represents a percentage of resource blocks of ABS allocated for UEs protected by ABS from inter-cell interference. The value of the "UEs protected by ABS" element may be used for percentage calculations in the DL ABS status but the specification does not indicate how to classify this group of UEs. This can lead to ambiguity in the interpretation of the meaning of the value of this information element. For example, a pico cell may allocate the entire ABS subframe regardless of the actual signal-to-noise ratio of the user equipment that are allocated these resources. The picocell may then report 100% usage of the ABS. Without additional information to clarify how the subframe resources are being allocated, the current definition of the % of ABS usage may yield 100% utilization regardless of any actual need to add or reduce the number of ABS subframes. In addition, the DL ABS status may correspond to a number of "UEs protected by ABS" or could be from a single aggressive UE;

Second, the downlink ABS status element allows the percentage of resource blocks of ABS allocated to user equipment to include undefined cases. For example, the current definition of DL ABS status relies on "unusable ABS patterns due to other reasons" which are not further explained in the current R10 specification Third, the Usable ABS Information element indicates the denominator of the percentage calculation. However, this information element may include all "0"s and this may lead to an invalid computation, e.g., a division by zero, when "Usable ABS Information" is all "0"s.

Fourth, the conventional definition of the ABS status information element does not provide a mechanism to inform the interfering eNBs of suitability of ABS pattern that has been configured. Consequently, a picocell cannot provide any feedback that indicates whether or not the allocated ABS pattern is suitable or desirable based on the needs and/or constraints of the picocell and/or user equipment.

At least in part to address these drawbacks in the conventional practice, the present application describes embodiments of techniques that facilitate communication between overlaying access nodes to support intercell interference coordination. For example, the present application describes messages and information elements that correct the ambiguous conventional definitions of the "UEs protected by ABS" and "protected ABS" in ABS Status IE. The present application also describes messaging techniques that allow overlaying access nodes to indicate preferences for ABS patterns. In one embodiment, a "Preferred ABS pattern" interpretation is incorporated into the LOAD INFORMATION message. The present application also describes embodiments that expand the use of the Usable ABS Pattern Information. For example, embodiments described herein support a combined new interpretation of the all "0"s usable ABS pattern with different ABS percentage values to convey ABS information from the interfered eNB to the interfering eNB. Persons of ordinary skill in the art having benefit of the present disclosure should appreciate that different implementations of access nodes may include different combinations of the features or embodiments described in the present application. For example, overlaying access nodes in one wireless communication system may implement all the features including the modifications to the DL ABS status element, the Usable ABS Pattern Information, and any other elements that may be included in the ABS Status IE. Alternatively, the overlaying access nodes may implement a subset that includes a selected combination of the features or embodiments described herein.

In one embodiment, an overlaying access node such as a picocell can feedback information indicating how many user equipment are being "protected" by the allocated almost blank subframe. "Protected" user equipment may be user equipment that would have unacceptably low signal-to-noise ratios if the overlaying macrocell was transmitting while the user equipment was being served by the pico cell. The DL ABS Status may then be defined so that only ABS resources allocated for "UEs protected by ABS" are counted into the percentage calculation. The "UEs protected by ABS" may be interpreted to include only UEs that require restricted subframe measurements. For example, one possible definition of "UEs protected by ABS" may include the UEs that are configured with restricted radio resource management (RRM/RLM) and/or channel state information (CSI) measurement resources. The protected user equipment may also be scheduled in the resource blocks of the subframes corresponding to an ABS within the latest period of Resource Status Reporting.

In other embodiments, which may be implemented separately or in combination with the other embodiments described herein, a picocell may feedback a specific number of protected user equipment or a number of user equipment that could benefit from protection but were not allocated resources in the ABS pattern. When first cell is overlapped by a second cell, the second cell may receive a message indicating a number of devices selected to communicate with the first cell. A set of subframes during which communications are permitted to take place within the first cell can then be identified based on the number of devices selected to communicate with the first cell. For example, the set of subframes may include a set of almost blank subframes during which the second cell bypasses transmission of data traffic. In some embodiments, signaling used to transmit system information, broadcast information, timing, reference signals, and the like may be transmitted during the almost blank subframes. An indication of the set of subframes may then be delivered to the first cell.

Embodiments of this type of feedback may be used to improve the system load balance and quality of service operation by signaling the number of the UEs that are protected by ABS or the number of UEs that have been configured for restricted measurement but were not scheduled in the currently allocated almost blank subframes. This feedback may provide a more complete representation of the ABS usage at the interfered eNB, which could better assist the interfering eNB to know the DL ABS status so that the interfering eNB could set or modify or alter the ABS pattern accordingly. For example, the interfering eNB may increase or decrease the allocated ABS subframes in response to an increasing or decreasing number of protected user equipment. Alternatively, information indicative of ratios of the numbers of protected user equipment to the total number of user equipment served by the interfered eNB may be fed back. The numbers of protected user equipment may include numbers of user equipment that are configured to communicate with the eNBs and/or numbers of user equipment that are scheduled for communication and/or actually in communication with the eNBs. This kind of UE number indication can be defined or specified by the relevant standards, e.g., in revisions to TS 36.423 that define a new X2 signaling element that can be added in the ABS Status IE group. In various alternative embodiments, the information element that indicates the number of user equipment may use one or more of the following exemplary formats. However, persons of ordinary skill in the art having benefit of the present disclosure should appreciate that these formats are intended to be exemplary and alternative embodiments may use different formats, combinations of the formats described herein, or other configurations.

Once the ABS subframes have been identified, user equipment can be configured to communicate with the interfered eNB during the ABS subframes, thereby reducing interference from the interfering eNB. The user equipment may also be scheduled for communication during the ABS subframes, e.g., by the interfered eNB and may then communicate with the interfered eNB during the ABS subframes. During the ABS subframes, substantially no communication takes place between the user equipment and the interfering eNB. Persons of ordinary skill in the art having benefit of the present disclosure should appreciate that the phrase "substantially no communication" indicates that the user equipment is not "listening" to the interfering eNB and the interfering eNB is bypassing transmission of data traffic between the user equipment and the interfering eNB. However, the interfering eNB may still be transmitting system information, broadcast information, timing information, reference signals, and the like, as discussed herein.

| Format A: Direct Quantity Indication | | | | |
|---|---|---|---|---|
| IE/Group Name | Presence | Range | IE type and reference | Semantics description |
| Protected UE Info | O | | INTEGER (0 . . . 50) | The number of the UEs UEs protected by ABS from inter-cell interference. |

| Format A': Direct Quantity Indication | | | | |
|---|---|---|---|---|
| IE/Group Name | Presence | Range | IE type and reference | Semantics description |
| Protected UE Info | O | | INTEGER (0 . . . 50) | The number of UEs that have been configured restricted measurement but unable to be scheduled in the almost blank subframes. |

| Format B: Indirect Quantity Level Indication | | | | |
|---|---|---|---|---|
| IE/Group Name | Presence | Range | IE type and reference | Semantics description |
| Protected UE Info | O | | BITSTRING (SIZE(3)) | The 3-bit bitstring indicates 8 quantified levels of the number of the UEs protected by ABS from inter-cell interference. "000" = "the number is 0" "001" = "the number is from 1 to 5" "010" = "the number is from 6 to 9" "011" = "the number is from 10 to 14" "100" = "the number is from 15 to 19" "101" = "the number is from 20 to 29" "110" = "the number is from 30 to 39" "111" = "the number is above 40" |

| Format B': Indirect Quantity Level Indication | | | | |
|---|---|---|---|---|
| IE/Group Name | Presence | Range | IE type and reference | Semantics description |
| Protected UE Info | O | | BITSTRING (SIZE(3)) | The 3-bit bitstring indicates 8 quantified levels of the number of the UEs that have been configured restricted measurement but unable to be scheduled in the almost blank subframes. "000" = "the number is 0" "001" = "the number is from 1 to 5" "010" = "the number is from 6 to 9" "011" = "the number is from 10 to 14" "100" = "the number is from 15 to 19" "101" = "the number is from 20 to 29" "110" = "the number is from 30 to 39" "111" = "the number is above 40" |

Figure 2:
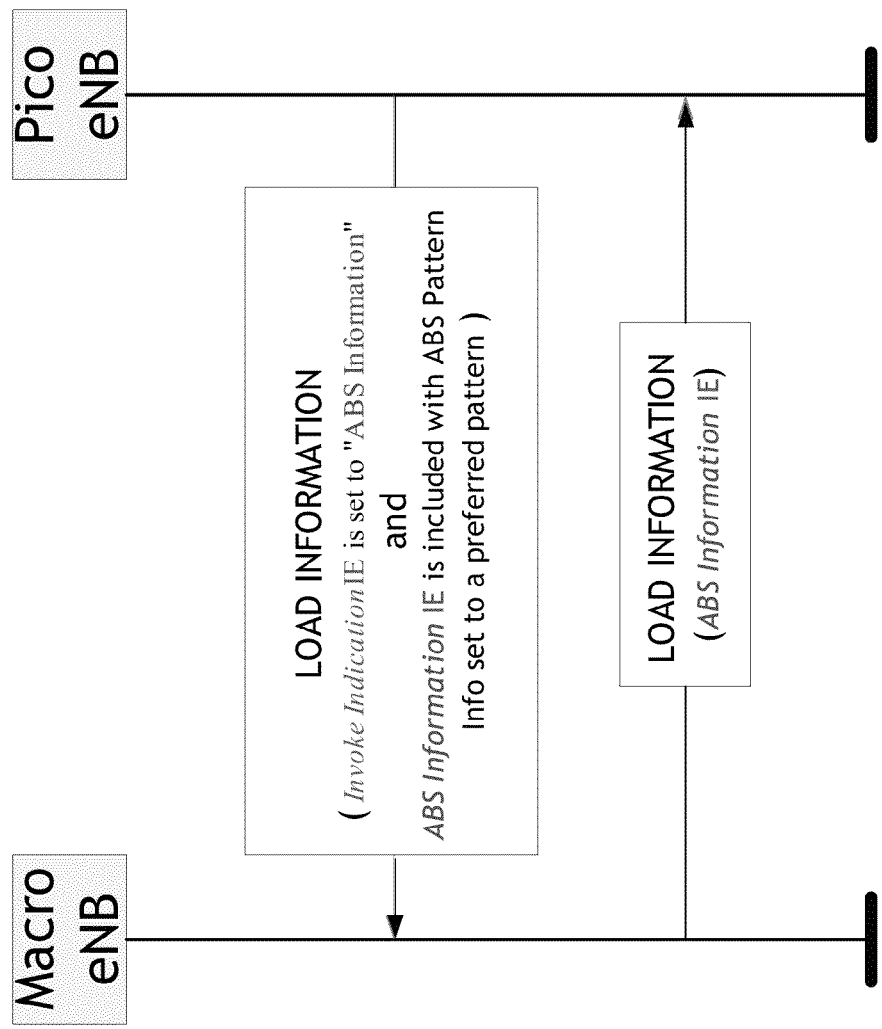
FIG. 2 conceptually illustrates a first exemplary embodiment of a method of requesting an almost blank subframe (ABS) pattern.

FIG. 2 conceptually illustrates a first exemplary embodiment of a method of requesting an almost blank subframe (ABS) pattern. In the illustrated embodiment, an access node such as a picocell that is receiving interference from an overlaying macrocell may explicitly request its preferred ABS pattern or implicitly indicate a request for the interfering macro eNB to reconfigure to another ABS pattern. Providing indications of the preferred ABS pattern may simplify and enhance the coordination process of the ABS deployment, particularly in systems that include numerous macrocells and numerous overlaying picocells. For example, picocells may receive information allocating ABS patterns from multiple macrocells and may use this information to select an ABS pattern that makes best use of the ABS subframes indicated in the different patterns. Information indicating the selected ABS pattern may be fed back to the corresponding macrocell or macrocells. For another example, macrocells may use feedback from different picocells to select an ABS pattern that best satisfies the differing requirements of the different picocells.

In the embodiment shown in FIG. 2, the interfered pico eNB could request a preferred ABS pattern from the interfering macro eNB by sending LOAD INFORMATION message in which 1) the ABS Information IE is included with the requested ABS pattern indicated in the ABS Pattern Info IE and 2) simultaneously or concurrently the Invoke Indication IE is set to "ABS Information". In this way, the preferred ABS pattern may be signaled to the interfering macro eNB. If the above two conditions 1) and 2) are satisfied at the same time, the interfering eNB may take the received ABS Information into consideration for ABS scheduling. However, the interfering eNB may not consider such information as immediately applicable and so the interfering eNB may optionally use the feedback in subsequent ABS scheduling and/or allocation. However, signaling the entire requested ABS pattern may incur significant overhead. For example, if ABS subframe patterns are allocated periodically, e.g., once for every 40 subframes, then an access node should provide at least 40 bits of feedback to indicate the ABS pattern requested for the subsequent 40 subframes.

Figure 3:
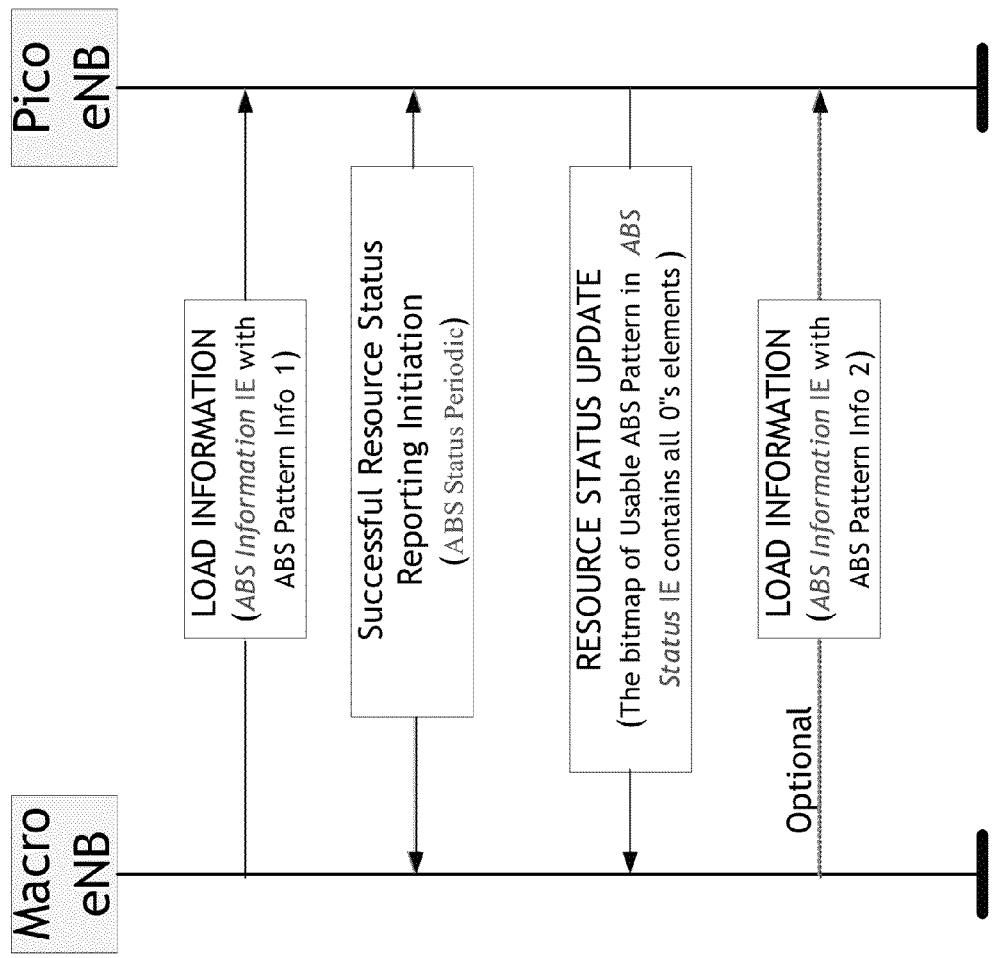
FIG. 3 conceptually illustrates a second exemplary embodiment of a method of requesting an almost blank subframe (ABS) pattern.

FIG. 3 conceptually illustrates a second exemplary embodiment of a method of requesting an almost blank subframe (ABS) pattern. Instead of signaling an entire requested ABS pattern, access nodes that operate according to the second exemplary embodiment may signal whether or not the currently allocated ABS pattern is suitable. This may reduce the signaling overhead because the access node only has to indicate whether or not a pattern is suitable and does not have to indicate an entire ABS pattern. However, persons of ordinary skill in the art having benefit of the present disclosure should appreciate that access nodes may be configured to use either one or both of the techniques for requesting the almost blank subframe shown in FIGS. 2 and 3. For example, some access nodes may be capable of using either technique and may be configured to utilize one or the other technique depending on the current circumstances.

In the embodiment shown in FIG. 3, the interfered pico eNB could request from the interfering macro eNB a different ABS pattern from the currently received/allocated ABS pattern by reporting all "0"s in the elements of a Usable ABS Pattern information element, which may be transmitted in a RESOURCE STATUS UPDATE message. In different embodiments, an all "0"s usable ABS pattern could be interpreted in different ways. For example, an all "0"s pattern bitmap may be understood to indicate that the interfered eNB does not need protection from ABS. In that case, the interfering eNB may reduce the number of ABS subframes that are allocated. For another example, an all "0"s pattern bitmap may be understood to indicate that the interfered eNB requires ABS protection but the currently configured pattern from the interfering eNB is not suitable to the interfered eNB.

The conventional DL ABS Status information element uses the value of the Usable ABS Pattern as the denominator for the percentage calculation. Consequently, the conventional percentage in DL ABS status is meaningless (and includes a division by zero) if the Usable ABS Pattern information element contains an all "0"s bitmap. The all "0"s bitmap in the Usable ABS Pattern information element may therefore be reinterpreted or redefined to convey additional information. In one embodiment, the access node may interpret the combination of an all "0"s pattern in the Usable ABS Pattern information element and a 0 percentage value in the DL ABS Status information element as indicating that the interfered eNB does not need protection from ABS. Alternatively, the interfered eNB may request a different ABS pattern from the current one by reporting an all "0"s pattern in the Usable ABS Pattern information element and reporting a 100% value in the DL ABS Status information element. Persons of ordinary skill in the art having benefit of the present disclosure should appreciate that in alternative embodiments additional indications could be assigned to the combinations of all "0"s usable pattern with other percentage values.

Upon receiving all "0"s in the Usable ABS Pattern information element, the interfering macro eNB may take such information into consideration for modifying its ABS configuration. However, persons of ordinary skill in the art should appreciate that the final decision of ABS resource scheduling may be made by the interfering macro eNB. Consequently, the interfering macro eNB the information may not be required to respond to or acknowledge reception of the information indicating the "preferred ABS pattern" or "request for a different ABS pattern." In the illustrated embodiment, this information indicates a recommendation or a request for ABS pattern reconfiguration from pico eNB to macro eNB. One exemplary embodiment of a Usable ABS Pattern information element is shown in Table 2. In one embodiment, this exemplary embodiment may be specified by standard such as a revised version of 3GPP TS 36.423.

TABLE 2

| IE/Group Name | Presence | Range | IE type and reference | Semantics description |
|---|---|---|---|---|
| >>Usable ABS Pattern Info | M | | FDD: BIT STRING (SIZE(40)) TDD: BIT STRING (1 ... 70) | Each position in the bitmap represents a subframe, for which value "1" indicates 'ABS that has been designated as protected from inter-cell interference' and value "0" indicates 'ABS that is not usable as protected ABS from inter-cell interference'. The pattern represented by the bitmap is a subset of, or the same as, the corresponding ABS Pattern Info IE conveyed in the LOAD INDICATION message. The pattern represented by an all "0"s bitmap together with 100 percentage value in DL ABS status indicates requesting a different ABS |

TABLE 2-continued

| IE/Group Name | Presence | Range | IE type and reference | Semantics description |
| --- | --- | --- | --- | --- |
| | | | | pattern from the corresponding ABS Pattern Info IE conveyed in the LOAD INDICATION message; The pattern represented by an all "0"s bitmap together with 0 percentage value in DL ABS status indicates the interfered eNB does not need protection from ABS. |

In summary, the present application describes embodiments of messages that may be exchanged between overlaying access nodes and used to coordinate allocation of almost blank subframes. Exemplary embodiments of the techniques described in the present application may be implemented as enhancements to conventional signaling over the X2 interface between eNBs. For example, the conventional ABS Status IE for macro-pica case may be modified to include a new definition of "UEs protected by ABS" in percentage calculation of DL ABS status, a report that indicates "Protected UE Info," and/or information indicating a request for a preferred or a different ABS pattern. Embodiments of the messages that use the definition of "UEs protected by ABS" described herein may support useful and meaningful feedback of ABS subframe usage by the interfered cell. Various embodiments of the "Protected UE Info" information element may be used to enrich the DL ABS Status and help the network perform load-balancing and/or scheduling operations. Requesting a preferred pattern using embodiments of the techniques described herein may also have a number of advantages over conventional practice. For example, the techniques described herein may provide more detailed information about the real requirements of the interfered eNB and thus helps to reduce the probability of configuring unsuitable or unacceptable ABS patterns. For another example, embodiments of the feedback described herein may indicate the suggested ABS subframe locations. The interfering eNB may then use this information to decide whether and where to add or reduce an ABS subframe. This information cannot be derived from conventional ABS Status IEs. For yet another example, when a desirable 'common subset' of ABS subframes is not coordinated between the interfering eNBs (e.g., via OAM configuration which is static or semi-static), the proposed IE now enables the interfering eNBs to request a common ABS.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method for controlling communications within a first cell that is overlapped by a second cell, comprising:
  receiving a signal at the second cell indicating a number of devices selected to communicate with the first cell, wherein the number of devices selected to communicate with the first cell is based on a ratio of a number of devices scheduled to communicate with the first cell and a number of devices configured to communicate with the first cell;
  identifying a set of subframes during which communications are permitted to take place within the first cell based on the number of devices selected to communicate with the first cell; and
  delivering an indication of the set of subframes to the first cell.

2. A method for controlling communication within a first cell that is overlapped by a second cell, comprising:
  delivering a signal from the first cell indicating a number of devices selected to communicate with the first cell, wherein the number of devices selected to communicate with the first cell is based on a ratio of a number of devices scheduled to communicate with the first cell and a number of devices configured to communicate with the first cell; and receiving a signal indicating a set of subframes during which communications are permitted to take place within the first cell based on the number of devices selected to communicate with the first cell; and communicating with the one or more of the devices via the first cell during the set of subframes.

3. A method for controlling communications within a first cell that is overlapped by a second cell, comprising:

identifying at the first cell a number of devices selected to communicate with the first cell, and communicating the number to the second cell, wherein the number of devices selected to communicate with the first cell is based on a ratio of a number of devices scheduled to communicate with the first cell and a number of devices configured to communicate with the first cell;

receiving the number at the second cell and identifying a set of subframes during which communications are permitted to take place within the first cell based on the number;

delivering an indication of the set of subframes to the first cell; and communicating with one or more of the devices via the first cell during the set of subframes.

4. A method for controlling communications within a first cell that is overlapped by a second cell, comprising:

receiving a signal at the second cell indicating a number of devices selected to communicate with the first cell, wherein the number of devices selected to communicate with the first cell is based on a ratio of a number of devices scheduled to communicate with the first cell and a number of devices configured to communicate with the first cell;

identifying at the second cell a set of subframes during which communications are permitted to take place within the first cell based on the number of devices selected to communicate with the first cell;

delivering an indication of the set of subframes to the first cell; and receiving a request at the second cell to alter the set of subframes during which communications are permitted to take place within the first cell.

5. A method for controlling communication within a first cell that is overlapped by a second cell, comprising:

delivering a signal from the first cell indicating a number of devices selected to communicate with the first cell, wherein the number of devices selected to communicate with the first cell is based on a ratio of a number of devices scheduled to communicate with the first cell and a number of devices configured to communicate with the first cell;

receiving a signal indicating a set of subframes during which communications are permitted to take place within the first cell based on the number of devices selected to communicate with the first cell;

communicating with the one or more of the devices via the first cell during the set of subframes; and sending a request to the second cell to alter the set of subframes during which communications are permitted to take place within the first cell.

6. A method for controlling communications within a first cell that is overlapped by a second cell, comprising:

identifying at the first cell a number of devices selected to communicate with the first cell, and communicating the number to the second cell, wherein the number of devices selected to communicate with the first cell is based on a ratio of a number of devices scheduled to communicate with the first cell and a number of devices configured to communicate with the first cell;

receiving the number at the second cell and identifying a set of subframes during which communications are permitted to take place within the first cell based on the number;

delivering an indication of the set of subframes to the first cell; and communicating with one or more of the devices via the first cell during the set of subframes; and sending a request to the second cell to alter the set of subframes during which communications are permitted to take place within the first cell.

7. A method, as set forth in claim 1, 2, 3, 4, 5, or 6, wherein the number of devices selected to communicate with the first cell further comprises a number of devices configured to communicate with the first cell.

8. A method, as set forth in claim 1, 2, 3, 4, 5, or 6, wherein the number of devices selected to communicate with the first cell further comprises a number of devices scheduled to communicate with the first cell.

9. A method, as set forth in claim 1, 2, 3, 4, 5, or 6, wherein the number of devices selected to communicate with the first cell further comprises a number of devices scheduled to communicate with the first cell and a number of devices configured to communicate with the first cell.

10. A method, as set forth in claim 1, 2, 3, 4, 5, or 6, wherein the set of subframes further comprises a set of subframes in which substantially no communications take place within the second cell.

11. A method, as set forth in claim 1, 2, 3, 4, 5, or 6, wherein the set of subframes further comprises a set of almost blank subframes.

12. A method, as set forth in claim 1, 3, 4, or 6, wherein identifying the set of subframes during which communications are permitted to take place within the first cell based on the number of devices selected to communicate with the first cell further comprises increasing the size of the set of subframes in response to an increased number of devices selected to communicate with the first cell.

13. A method, as set forth in claim 2 or 5, wherein receiving the signal indicating the set of subframes during which communications are permitted to take place within the first cell based on the number of devices selected to communicate with the first cell further comprises receiving a signal indicating an increasing size of the set of subframes in response to an increased number of devices selected to communicate with the first cell.

14. A method, as set forth in claim 4, wherein receiving the request at the second cell to alter the set of subframes during which communications are permitted to take place within the first cell further comprises receiving an indication that the set of subframes is unacceptable.

15. A method, as set forth in claim 4, wherein receiving the request at the second cell to alter the set of subframes during which communications are permitted to take place within the first cell further comprises receiving a revised set of subframes.

16. A method, as set forth in claim 5 or 6, wherein sending the request to the second cell to alter the set of subframes during which communications are permitted to take place within the first cell further comprises sending an indication that the set of subframes are unacceptable.

17. A method, as set forth in claim 5 or 6, wherein sending the request to the second cell to alter the set of subframes during which communications are permitted to take place within the first cell further comprises sending a revised set of subframes.

18. An apparatus, comprising:
a first cell; and
a second cell to receive a signal indicating a number of devices selected to communicate with the first cell, identify a set of subframes during which communications are permitted to take place within the first cell based on the number of devices selected to communicate with the first cell, and deliver an indication of the set of subframes to the first cell, wherein the number of devices selected to communicate with the first cell is based on a ratio of a number of devices scheduled to communicate with the first cell and a number of devices configured to communicate with the first cell.

19. An apparatus, comprising:
a first cell, and
a second cell, wherein the first cell delivers a signal indicating a number of devices selected to communicate with the first cell, receives a signal indicating a set of subframes during which communications are permitted to take place within the first cell based on the number of devices selected to communicate with the first cell, and communicates with the one or more of the devices during the set of subframes, wherein the number of devices selected to communicate with the first cell is based on a ratio of a number of devices scheduled to communicate with the first cell and a number of devices configured to communicate with the first cell.

20. An apparatus, comprising:
a first cell; and
second cell, wherein the first cell identifies a number of devices selected to communicate with the first cell, and communicates the number to the second cell,
the second cell receives the number and identifies a set of subframes during which communications are permitted to take place within the first cell based on the number, and delivers an indication of the set of subframes to the first cell, and
the first cell communicates with one or more of the devices during the set of subframes, wherein the number of devices selected to communicate with the first cell is based on a ratio of a number of devices scheduled to communicate with the first cell and a number of devices configured to communicate with the first cell.

21. An apparatus, comprising:
a first cell; and
a second cell, wherein the second cell receives a signal indicating a number of devices selected to communicate with the first cell, identifies a set of subframes during which communications are permitted to take place within the first cell based on the number of devices selected to communicate with the first cell, delivers an indication of the set of subframes to the first cell, and receives a request from the first cell to alter the set of subframes during which communications are permitted to take place within the first cell, wherein the number of devices selected to communicate with the first cell is based on a ratio of a number of devices scheduled to communicate with the first cell and a number of devices configured to communicate with the first cell.

22. An apparatus, comprising:
a first cell; and
a second cell wherein the first cell delivers a signal indicating a number of devices selected to communicate with the first cell, receives from the second cell a set of subframes during which communications are permitted to take place within the first cell based on the number of devices selected to communicate with the first cell, and sends a request to the second cell to alter the set of subframes during which communications are permitted to take place within the first cell, and communicates with the one or more of the devices during the set of subframes, wherein the number of devices selected to communicate with the first cell is based on a ratio of a number of devices scheduled to communicate with the first cell and a number of devices configured to communicate with the first cell.

23. An apparatus, comprising:
a first cell; and
a second cell, wherein the second cell receives a signal from the first cell indicating a number of devices selected to communicate with the first cell, identifies a set of subframes during which communications are permitted to take place within the first cell based on the number of devices selected to communicate with the first cell, and delivers an indication of the set of subframes to the first cell, and wherein
the first cell identifies a number of devices selected to communicate with the first cell, communicates the number to the second cell, sends a request to the second cell to alter the set of subframes during which communications are permitted to take place within the first cell, and communicates with the one or more of the devices during the set of subframes, wherein the number of devices selected to communicate with the first cell is based on a ratio of a number of devices scheduled to communicate with the first cell and a number of devices configured to communicate with the first cell.

24. An apparatus, as set forth in claim 18, 19, 20, 21, 22, or 23, wherein the number of devices selected to communicate with the first cell further comprises a number of devices configured to communicate with the first cell.

25. An apparatus, as set forth in claim 18, 19, 20, 21, 22, or 23, wherein the number of devices selected to communicate with the first cell further comprises a number of devices scheduled to communicate with the first cell.

26. An apparatus, as set forth in claim 18, 19, 20, 21, 22, or 23, wherein the number of devices selected to communicate with the first cell further comprises a number of devices scheduled to communicate with the first cell and a number of devices configured to communicate with the first cell.

27. An apparatus, as set forth in claim 18, 19, 20, 21, 22, or 23, wherein the set of subframes further comprises a set of subframes in which substantially no communications take place within the second cell.

28. An apparatus, as set forth in claim 18, 19, 20, 21, 22, or 23, wherein the set of subframes further comprises a set of almost blank subframes.

29. An apparatus, as set forth in claim 18, 20, 21, or 23 wherein identifying the set of subframes during which communications are permitted to take place within the first cell based on the number of devices selected to communicate with the first cell further comprises increasing the size of the set of subframes in response to an increased number of devices selected to communicate with the first cell.

30. An apparatus, as set forth in claim 19 or 22, wherein receiving the signal indicating the set of subframes during which communications are permitted to take place within the first cell based on the number of devices selected to communicate with the first cell further comprises receiving a signal indicating an increasing size of the set of subframes in response to an increased number of devices selected to communicate with the first cell.

31. An apparatus, as set forth in claim 21, wherein the second cell receiving the request to alter the set of subframes during which communications are permitted to take place within the first cell further comprises the second cell receiving an indication that the set of subframes is unacceptable.

32. An apparatus, as set forth in claim 21, wherein the second cell receiving the request to alter the set of subframes during which communications are permitted to take place within the first cell further comprises the second cell receiving a revised set of subframes.

33. An apparatus, as set forth in claim 22 or 23, wherein the first cell sending the request to the second cell to alter the set of subframes during which communications are permitted to take place within the first cell further comprises the first cell sending an indication that the set of subframes is unacceptable.

34. An apparatus, as set forth in claim 22 or 23, wherein the first cell sending the request to the second cell to alter the set of subframes during which communications are permitted to take place within the first cell further comprises the first cell sending a revised set of subframes.

* * * * *